United States Patent
Reed

(10) Patent No.: US 11,019,703 B2
(45) Date of Patent: May 25, 2021

(54) CURRENT INRUSH PROTECTION APPARATUS AND OPERATING METHOD THEREOF

(71) Applicant: Express Imaging Systems, LLC, Renton, WA (US)

(72) Inventor: William G. Reed, Seattle, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 125 days.

(21) Appl. No.: 16/517,137

(22) Filed: Jul. 19, 2019

(65) Prior Publication Data

US 2020/0029404 A1 Jan. 23, 2020

Related U.S. Application Data

(60) Provisional application No. 62/701,392, filed on Jul. 20, 2018.

(51) Int. Cl.
*H05B 45/50* (2020.01)
*H02H 9/02* (2006.01)

(52) U.S. Cl.
CPC ............... *H05B 45/50* (2020.01); *H02H 9/02* (2013.01)

(58) Field of Classification Search
CPC .......... H05B 45/50; H05B 47/25; H02H 9/02; H02H 9/002; H02M 7/062
USPC ....................................................... 361/93.9
See application file for complete search history.

(56) References Cited

U.S. PATENT DOCUMENTS

2012/0019971 A1* 1/2012 Flaherty .................. H02H 3/06
361/93.4

* cited by examiner

*Primary Examiner* — Dharti H Patel
(74) *Attorney, Agent, or Firm* — Cozen O'Connor

(57) ABSTRACT

A shorting cap apparatus is provided for enabling remote application of power, by an external system, to a load connected to the shorting cap apparatus while protecting components of the external system from potential damage due to high inrush current to the load. The shorting cap apparatus comprises a housing, a connector, and inrush current protection circuitry. The connector of the shorting cap apparatus may be connected to a corresponding connector associated with the load. Once the external system applies power, the protection circuitry provides a time delay to allow the load to sufficiently charge via a first set of resistors of the protection circuitry over a period of time before a set of switches of the protection circuitry are transitioned to a conducting state.

26 Claims, 7 Drawing Sheets

CURRENT INRUSH PROTECTION APPARATUS AND OPERATING METHOD THEREOF

BACKGROUND

Technical Field

The present disclosure relates to the field of protection of electrical devices and, more particularly, to the protection of devices from high current inrush.

Description of the Related Art

The advent of light-emitting diode (LED) lighting has saved a considerable amount of electrical energy and maintenance cost by replacing less efficient and less reliable High Intensity Discharge (HID) lighting systems. One drawback to the new LED lighting technology is the high inrush currents caused by the input structure of the electronic LED drivers. Inrush current occurs when power is first applied to the LED driver. Current briefly flows into the Electromagnetic Compliance (EMC) filters of at least some LED drivers, with the highest current flowing when the mains sinewave is at its maximum or minimum value. This current inrush can reach more than ten times the continuous operating current of the LED driver. For example, a 65 Watt LED driver produced by Meanwell Power Supplies has an inrush current of 30 Amps.

High inrush current for LED lighting may shorten the lifetime of some components of and/or devices associated with LED lighting systems, including control devices (e.g., photocontrols), contacts, and associated circuitry. High inrush current may be detrimental to both solid state and mechanical relay type controls. For instance, in some outdoor photocontrol switched LED luminaires, contact arcing caused by high inrush current is a particular problem because of the difficulty and expense of replacing failed photocontrols on pole mounted luminaires. However, effectively inhibiting or protecting against high inrush current has proved to be difficult—especially in the area of LED luminaires.

Some LED lighting installations use a single contactor or control (e.g., photocontrol) to switch on or off multiple LED luminaires at a time. FIG. 1A, for instance, shows a schematic diagram 100 in which an external control system 102, such as a photocontroller, controls application of power from a mains power source 104 to a set of LED luminaires 106. A shorting cap 108 may be installed in one or more of the LED luminaire 106, allowing the LED luminaires 106 to be under the control of a single control device 102 to turn on or off at the same time. In such an installation, the inrush current of multiple LED luminaires occurs approximately at the same time, causing extreme electrical stress on associated circuitry and devices. FIG. 1B shows a simulation 114 of the current inrush 112 experienced by the external control system 102 due to current inrush to the lighting system 106. Before time $T_0$, the control system 102 does not provide power from the mains power source 104 to the output of the control system 102. At time $T_0$, the control system 102 begins providing power from the mains power source 104 to the output of the control system 102, causing a high current inrush 112 of current to the LED luminaire 106. This current inrush 112 is sufficient to damage the control devices 102 and other circuitry and devices associated with the lighting system 106 as a result of illumination of one or more LED luminaires. In FIG. 1B, for instance, the current inrush 112 during an illumination even reaches approximately 160 Amps, which is sufficient to damage some components of the external control system 102.

DETAILED DESCRIPTION

Figure 1A:
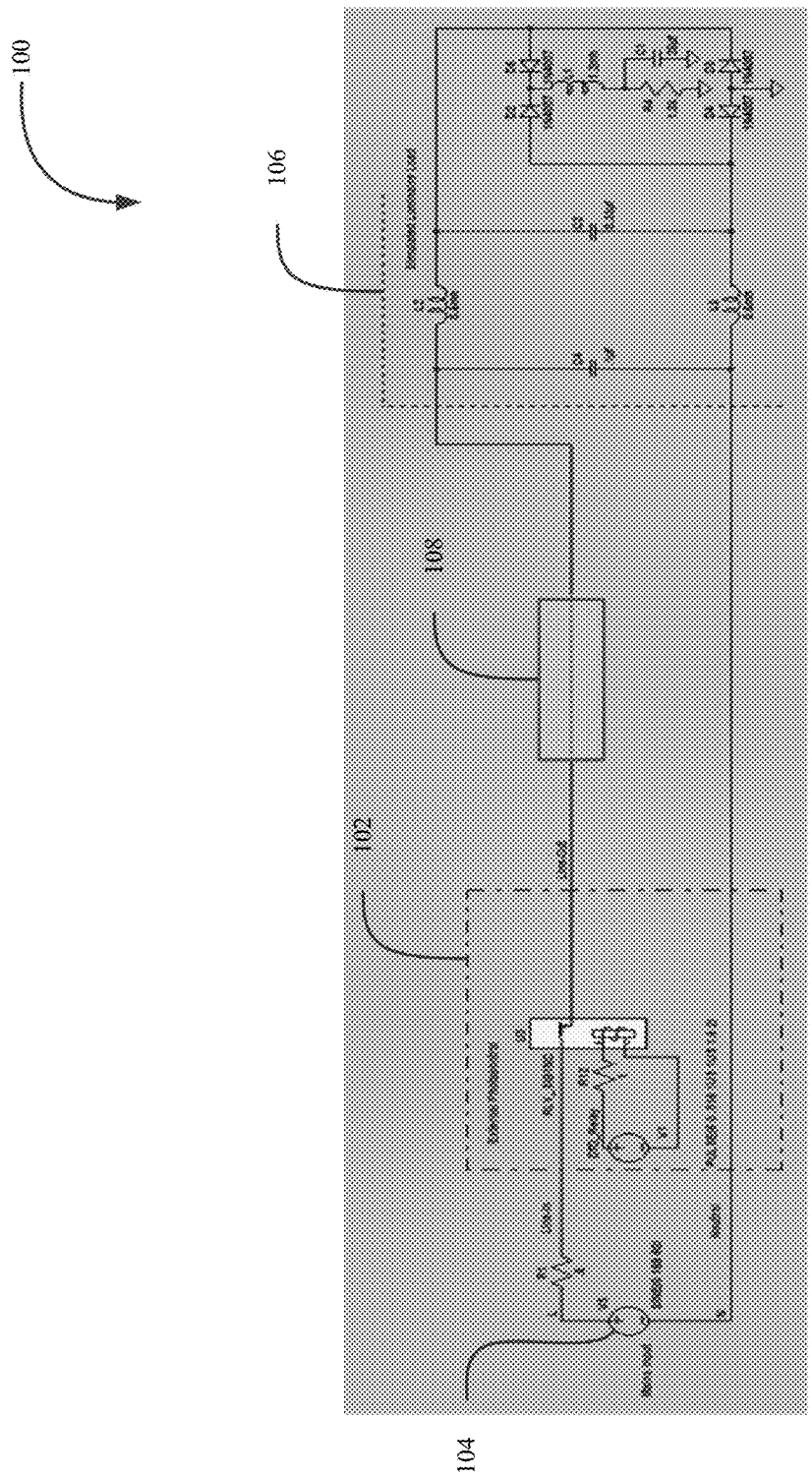
FIG. 1A shows a schematic diagram of a conventional shorting cap connecting an external control system to a lighting system.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid state lights have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one implementation" or "an implementation" or "one embodiment" or "an embodiment" means that a particular feature, structure or characteristic described in connection with the embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the term "set" refers to a non-zero collection of members or elements.

As used in this specification and the appended claims, the term "node" refers to a point in an electric or electronic circuit. A node, for instance, may refer to a terminal of a circuit element or a point at which two or more terminals of circuit elements are joined.

Technologies described and depicted in the instant disclosures relate to a shorting cap assembly that protects against potentially damaging current inrush that can occur during the application of power to a lighting system, such as an LED luminaire. The shorting cap assembly includes a housing containing active inrush protecting circuitry that protects one or more associated systems or devices, such as an external control system or a lighting system. The shorting cap assembly may be selectively attachable to a corresponding receptacle of a lighting system to enable the external control system to selectively illuminate or dim the lighting system. The shorting cap assembly includes active inrush current limiting circuitry that provides protection to devices or systems that may be damaged by current inrush to the lighting system. The active inrush current limiting circuitry may provide a buffer sufficient to charge the LED driver input capacitance before mains power is applied to the lighting system, helping to at least reduce the current inrush and help to prevent damage caused over time by high current inrush events. The shorting cap assembly may comprise a housing, one or more printed circuit boards including the active inrush current limiting circuitry, and a connector for selectively connecting the shorting cap assembly to a receptacle of a lighting system.

Figure 2:
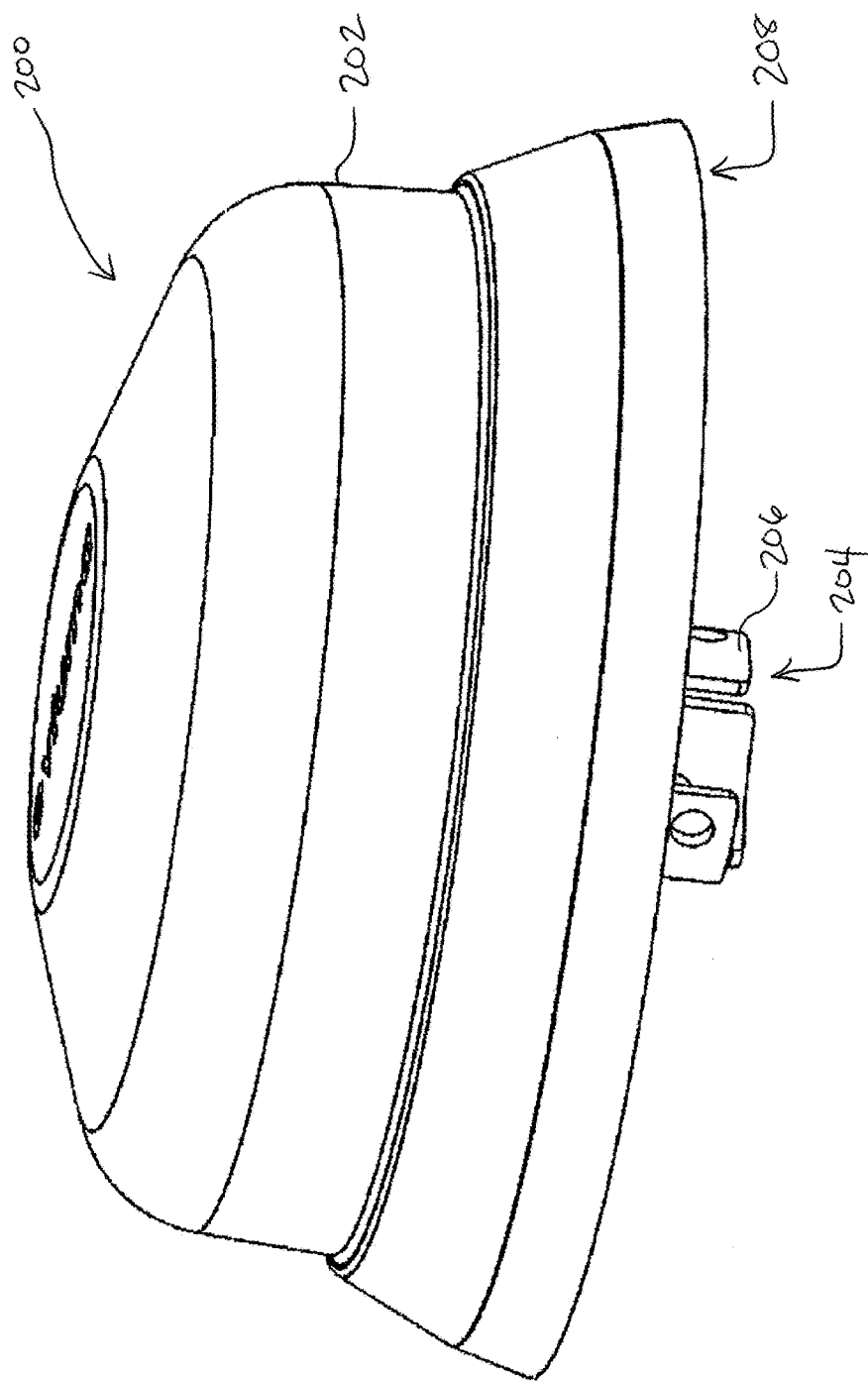
FIG. 2 shows a side perspective view of a shorting cap apparatus according to one or more implementations.

FIG. 2 shows a shorting cap apparatus 200 for providing electrical protection to one or more components of an associated system or subsystem according to one or more implementations. The shorting cap apparatus 200 includes a housing 202 having cylindrical sidewalls and containing electrical components for protecting an attached system or subsystem. In some implementations, the housing 202 may have a circular cross-sectional shape. In some implementations, the housing 202 may have a cylindrical shape or dome shape with an upper surface, a lower surface in a parallel relationship to the upper surface, and curved sidewalls extending between the upper surface and the lower surface. In some embodiments, the housing 202 may have a puck-like shape wherein the thickness of the housing 202 is small relative to its width.

The shorting cap apparatus 200 includes a connector 204 comprising a set of electrical male connector members 206 is provided at a bottom side 208 thereof. The connector 204 is provided for selectively connecting the shorting cap apparatus 200 to a lighting system, such as an LED luminaire. The set of male connector elements 206 engage with corresponding female connector elements of a receptacle of the lighting system to establish an electrical and mechanical connection between the lighting system and the shorting cap apparatus 200. In at least some of those implementations, the male connector elements 206 are concentrically arranged on and extend downwardly from the bottom side 208 of the housing 202.

The male connector elements 206 of the connector 204 may be sized and shaped for insertion into the corresponding female connector elements of the receptacle of the lighting system. The male connector elements 206 are electrically conductive elements that are connected to electrical elements, such as contacts, within the housing 202. The male connector elements 206 may each have a shank portion the bottom side 208 and ending in an portion having a dimension wider than the shank portion. With the male connector elements 206 inserted into the corresponding female connector elements of the lighting system, the protection apparatus 200 may be rotated to engage the male connector elements 206 with a corresponding opposing surface within the female connector elements of the lighting system, thereby creating a secure attachment between the lighting system and the shorting cap apparatus 200. The secure attachment may create a secure mechanical attachment as well as one or more electrical connections between the connector of the lighting system and the connector 204 of the shorting cap apparatus 200. In at least some implementations, the male connector elements 206 are designed according to one or more ANSI C136 standards, such as ANSI C136.41-2013. In some implementations, however, the housing 202 may have an interface other than the connector 204 for establishing an electrical and/or mechanical connection with the lighting system.

Figure 3:
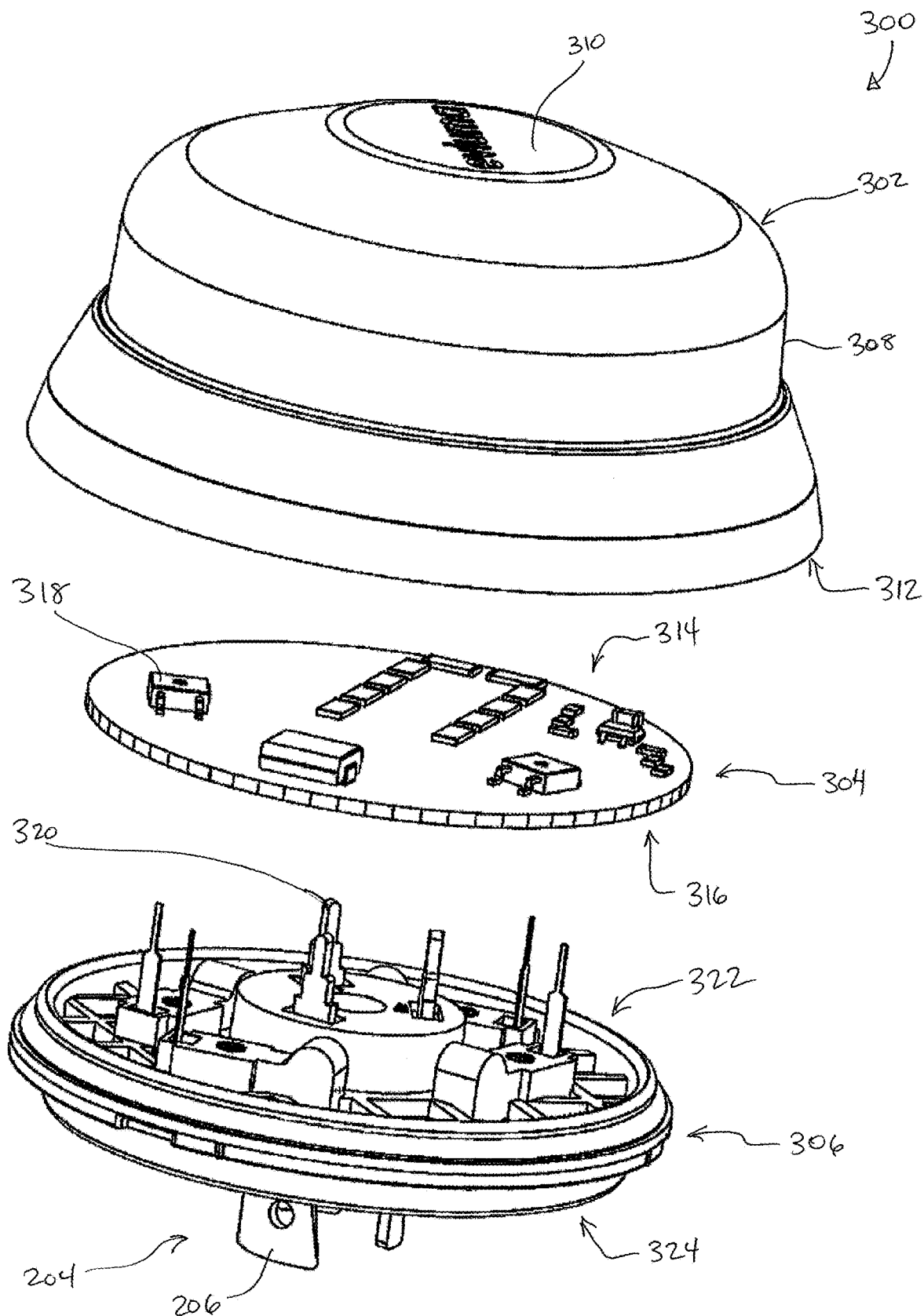
FIG. 3 is an exploded view of the shorting cap apparatus of FIG. 2 according to one or more implementations.

FIG. 3 an assembly 300 of the shorting cap apparatus 200 of FIG. 2 according to one or more implementations. The assembly 300 includes a housing main body 302 for housing parts of the shorting cap apparatus 200, one or more printed circuit boards ("PCB") 304, and a base member 306. The housing main body 302 depicted has a substantially cylindrical shape with sidewalls 308 extending downwardly from an upper side 310 of the housing main body 302 to form a cavity 312 for receiving and housing the PCB 304 and at least a portion of the base member 306. The housing main body 302 may be comprised of a rigid, weather-resistant material. In some implementations, the housing main body 302 is comprised of a plastic material. In some implementations, the housing main body 302 may be cast or molded in a solid plastic resin. In some implementations, the housing main body 302 may be comprised of metal.

The PCB 304 includes a first face 314 and a second face 316 opposite to the first face 314, the first face 314 and the second face 316 being separated by a thickness of the PCB 304. The first face 314 and the second face 316 may each be planar, and may be parallel to each other. The PCB 304 may be comprised of one or more of a non-conductive resin or composite, such as fiberglass FR4, epoxy/Kevlar fiber or thermosetting plastic, or ceramic, or metal covered with nonconductive coating or film, or other non-conductive material. In some implementations, the PCB 302 may be circular in shape and may have a diameter of about 5 inches, although such shapes and dimensions are considered to be non-limiting. In some implementations, the PCB 304 may include a plurality of electrical traces or other electrically conductive pathways for conducting electrical signals between different portions of the PCB 304. The PCB 904 may include one or more apertures ("vias") that extend between the first face 314 and the second face 316, with such apertures being used to electrically couple electronic components to one or more of the electrical traces or other conductive pathways. Such electrical coupling may be performed, for example, manually through soldering the electronic components, and/or such electrical coupling may be performed, for example, mechanically or automatically using pick-and-place technology. In some implementations, the electronic components and electrical traces and/or pathways may form one or more electronic circuits that operate in accordance with the description of the protection apparatus 200.

A plurality of components 318 comprising the active current inrush protection circuitry are electrically and mechanically connected to one or both of the first face 314 and the second face 316. The plurality of components 318 are electrical and/or electronic components that may have a form factor for installation on printed circuit boards. Individual ones of the plurality of components 318 may be electrically connected to other ones of the plurality of components 318 via the electrical traces, vias, soldering, or other electrically conductive paths between components. A set of contact portions or connectors (not pictured) may be provided on the second face 316 of the PCB 304 for engaging with corresponding connector elements 320 of the base member 306.

The base portion 306 comprises an upper portion 322 having a plurality of connector elements 320 provided thereon. In some implementations, such as the one depicted in FIG. 3, the connector elements 320 are prongs having an elongated shape and which are comprised of an electrically conductive material (e.g., copper) for conducting electricity from the male connector members 206 of the connector 204 to at least some of the plurality of components 318. In some implementations, the connector elements 320 may be wires that are soldered or otherwise electrically connect the connector members 206 with corresponding components 318.

The PCB 304 may be positioned within the cavity 312 of the housing main body 302 opposite to the upper side 310. The PCB 304 may be positioned within the cavity 312 such that electrical contact portions of the PCB 304 are appropriately aligned with the connector elements 320 (e.g., receptacles) extending upwardly from the upper portion 322 of the base member 306. The base member 306 may be positioned within the cavity or recess underneath the PCB 304 to contain the PCB 304 within the cavity. The base member 306 may have one or more electrically conductive vias extending there through to allow communicable coupling of electrical and/or electronic components installed on the PCB 304 with the connector 204 provided on a lower portion 324 of the base member 306. With the PCB 304 positioned in the cavity 312 and the base member 306 positioned over and enclosing the PCB 304 in the cavity 312, the base member 306 may be attached at or within the opening of the cavity 312 to form the shorting cap apparatus 200. Attachment of the base member 306 to the housing main body 302 include rotating the base member 306 relative to the housing main body 302 to engage respective threaded portions thereof, snap-fitting corresponding portions of the housing main body 302 and the base member 306, or using adhesive or welding to join the base member 306 and the housing main body 302, by way of non-limiting example.

The shorting cap apparatus 200 may be installed on a lighting system, e.g., via engagement of the connector 204 with a receptacle on the an LED luminaire, instead of a control device to enable the lighting system to be under the control of an external control device. Typical shorting cap devices have a shorting bar with a low impedance installed between connector elements of the shorting cap. By contrast, the shorting cap apparatus 200 includes active inrush current protection circuitry electrically connected to two or more of the male connector elements 206 to protect the external control device and/or the lighting system from potentially damaging inrush current upon illumination of the lighting system.

Figure 4:
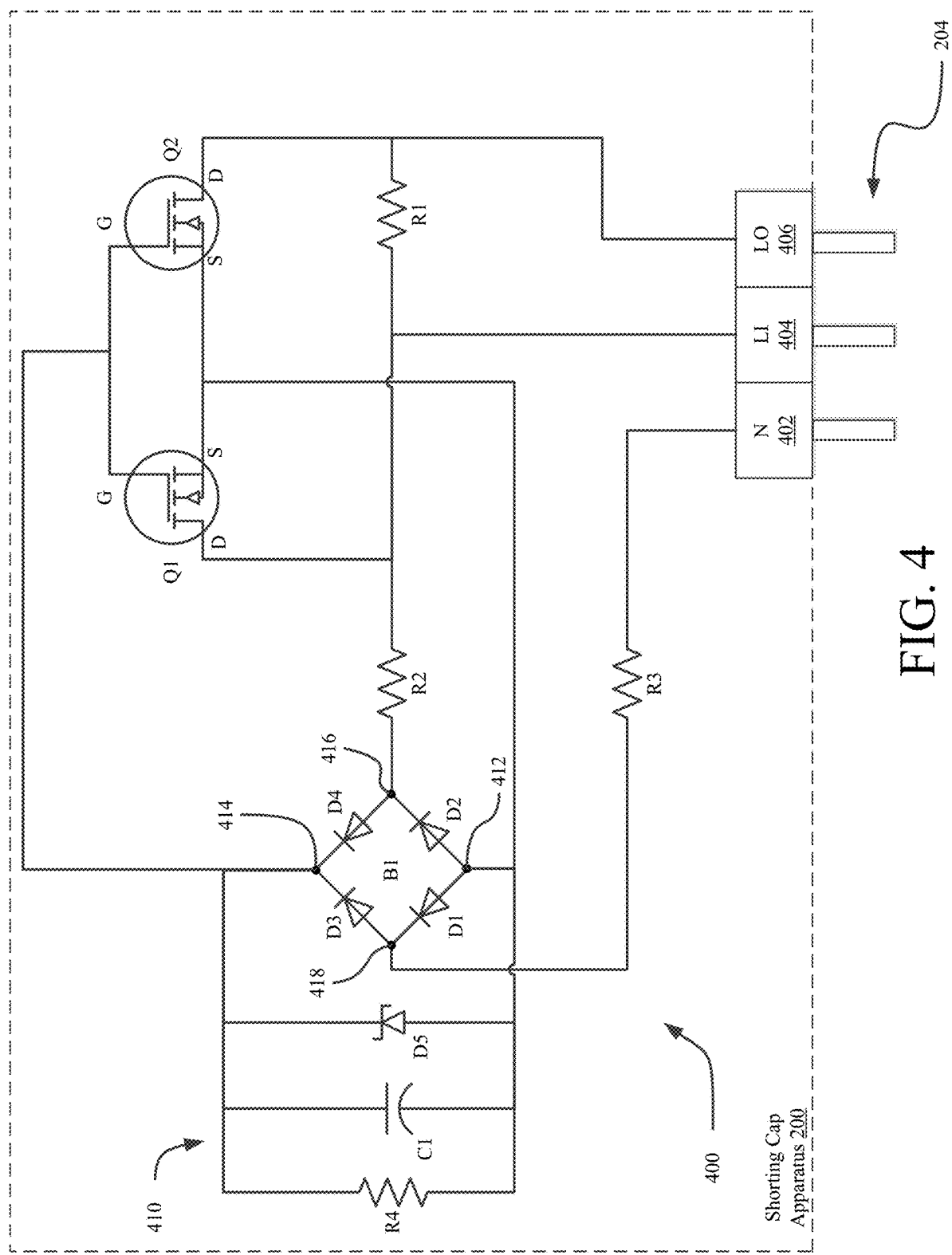
FIG. 4 is a schematic diagram of protection circuitry of the shorting cap apparatus according to one or more implementations.

FIG. 4 shows active inrush current protection circuitry 400 according to one or more implementations described herein. The protection circuitry 400 comprises a set of passive and active electrical components provided on the PCB 302. The protection circuitry 400 is electrically connected to electrical connection points on the PCB 302 that interface with corresponding male connector members 206 of the connector 204. In particular, a neutral line connection point (N) 402 connects to a first male connector member 206 for connecting to neutral lines of the external control system 102 and the lighting system 106, which correspond to a negative terminal of the mains power source 104 (see FIG. 5). A line-in connection point (LI) 404 connects to a second male connector member 206 for connecting to a line-out of the external control system 102, which corresponds to a positive terminal of the mains power source 104 when a switch of the external control system 102 is closed. A line-out connection point (LO) 406 connects to a third male connector member 208 for connecting to a line-in of the lighting system 106. Each of the neutral line 402, the line-in 404, and the line-out 406 is connected to a different node in the protection circuitry 400.

The protection circuitry 400 comprises a set of solid state switches—here, a pair of solid state switches Q1 and Q2—connected in series between the line-in 404 and the line-out 406 according to one or more implementations. The solid state switches Q1 and Q2 depicted in FIG. 4 are N-channel MOSFETs; however, other types of solid state switches may be appropriate with proper modification of the protection circuitry 400. The solid state switches Q1 and Q2 have source nodes S connected to each other, and gate nodes G connected to each other. A delay subcircuit 410 is connected between the source nodes S and the gate nodes G of the solid state switches Q1 and Q2. The delay subcircuit 410 is a subcircuit operable to selectively control a conducting state of the solid state switches Q1 and Q2. The delay subcircuit 410 comprises a diode bridge B1 connected in parallel with a capacitor C1. The diode bridge B1 comprises a first pair of diodes D1 and D2 each having an anode connected to a first node 412, and a second pair of diodes D3 and D4 each having a cathode connected to a second node 414. A cathode of the diode D2 is connected to an anode of the diode D4 at a third node 416 of the diode bridge B1. A cathode of the diode D1 is connected to an anode of the diode D3 at a fourth node 418 of the diode bridge B1. In some implementations, the protection circuitry 400 may optionally include a Zener diode D5 connected in parallel with the capacitor C1 and the diode bridge B1. In such implementations, the cathode of the Zener diode D5 is connected to the first node 412 and an anode of the Zener diode D5 is connected to the second node 414. The Zener diode D5 is also connected in parallel with the capacitor C1. The Zener diode D5 helps to protect against potential damage due to transient high voltage. A resistor R4 may be connected in parallel with the capacitor C1 and the diode bridge B1. The resistor R4 decreases the reset time of the delay subcircuit 410 so that in the event of rapid power fluctuations, the current inrush limiting effect of the protection circuitry 400 remains active.

A first resistor R1 is connected between the line-in 404 and the line-out 406. The first resistor R1 is connected in parallel with the solid state switches Q1 and Q2 such that a first terminal of the first resistor R1 is connected to the drain node D of the solid state switch Q1 and a second terminal of the first resistor R1 is connected to the drain node D of the solid state switch Q2. A first terminal of a second resistor R2 is connected to the third node 416 of the diode bridge B1 between the cathode and anode respectively of the diode D2 and the diode D4. A second terminal of the second resistor R2 is connected to the line-in 404 and the drain node of the solid state switch Q1. A first terminal of a third resistor R3 is connected to the fourth node 418 of the diode bridge B1 between the cathode and anode respectively of the diode D1 and the diode D3. A second terminal of the third resistor R3 is connected to the neutral line 402. Although only a single resistor is depicted respectively for the first resistor R1, the second resistor R2, and the third resistor R3, these respective resistors may be replaced by a set of resistors in series and/or in parallel to achieve the desired resistance between the corresponding nodes of the protection circuitry 400 and to achieve the desired power handling capability. The use of multiple resistors on the PCB 304 in place of a single resistor may be preferable in some instances to reduce cost.

Figure 5:
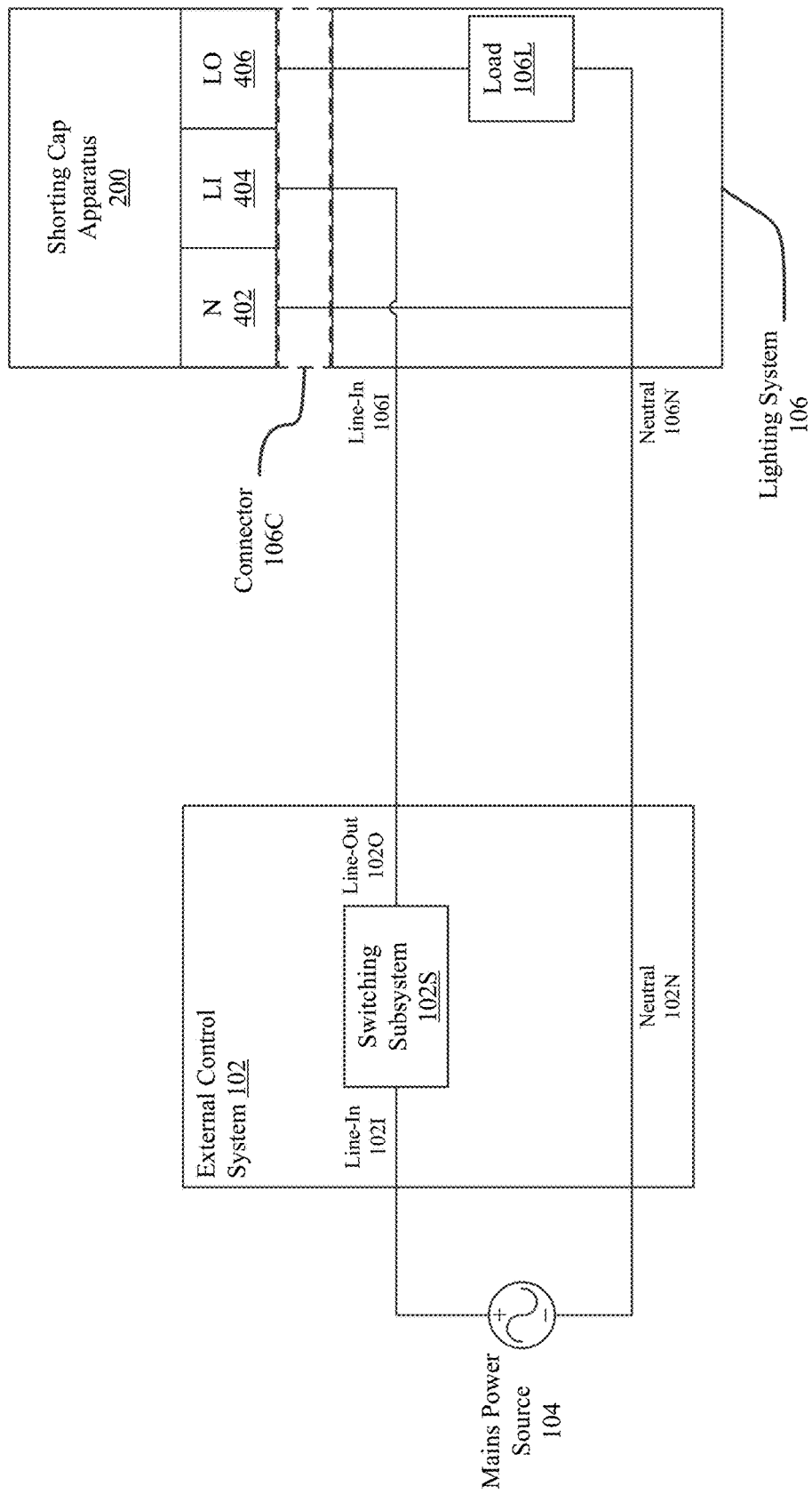
FIG. 5 is a schematic diagram of the shorting cap apparatus interconnected with an external control system and a lighting system according to one or more implementations.

FIG. 5 illustrates interconnection of the novel shorting cap apparatus 200 with the lighting system 106, external control system 102, and the mains power source 104 according to one or more implementations. The male connector elements 206 of the connector 204 are electrically connected to the connector 106C of the lighting system 106 to transition the lighting system 106 to be remotely controlled by the external control system 102. As described herein, male connector elements 206 of the connector 204 are in direct electrical communication with respective ones of the neutral line 402, the line-in 404, and the line-out 406. Attachment of the shorting cap apparatus 200 to the connector 106C of the lighting system 106 connects the line-out 102O of the external control system 102 to the line-in 404 of the shorting cap apparatus 200, connects the neutral line 402 of the shorting cap apparatus 200 with the neutral lines 102N and 106N respectively of the external control system 102 and the lighting system 106, and connects the line-out 406 of the shorting cap apparatus 200 with a load 106L (e.g., LED driver, LEDs) of the lighting system 106.

Figure 1B:
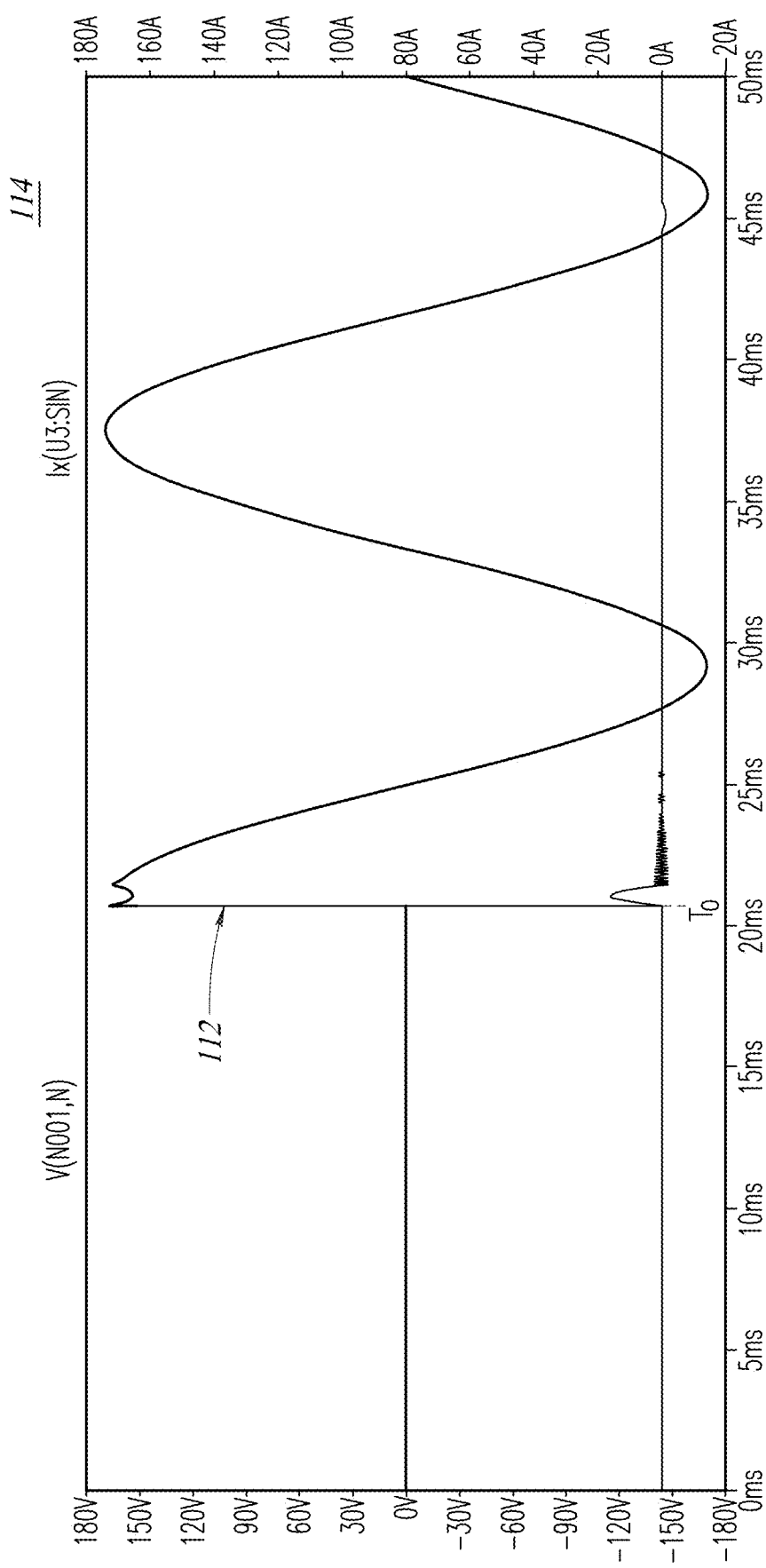
FIG. 1B shows a simulation of current inrush experienced by the external control system of FIG. 1A as a result of closing a switching subsystem of the external control system.

Connection of the shorting cap apparatus 200 enables the external control system 102 to remotely control illumination and dimming of the lighting system 106 via a switching subsystem 102S of the external control system 102. The switching subsystem 102S includes an electromechanical switch, such as a relay, operable to selectively control the supply of mains power from the mains power source 104 to the load 106L of the lighting system 106 via an electrical path included in the shorting cap apparatus 200. In particular, the switching subsystem 102 transitions between an open state in which mains power is prevented from being supplied from the mains power source 104 to the lighting system 106 and a closed state in which mains power is supplied from the mains power source 104 to the lighting system 106. At least some components of the external control system 102, such as components in the switching subsystem 102S (e.g., contacts of a relay), may experience damage due to the effects of the high inrush current that an LED driver of the lighting system 106 draws when mains power is initially supplied to the lighting system 106, as described with respect to FIG. 1 above.

The active inrush current protection circuitry 400 of the shorting cap apparatus 200 protects the external control system 102 due to the potentially deleterious effects of the high inrush current to the lighting system 106. In connection with a transition event of the switching subsystem 102S from the open state to the closed state, the protection circuitry 400 limits current inrush for a time period sufficient to allow the LED driver of the lighting system 102 to charge without causing an excessive inrush of current. After the time period sufficient to charge the LED driver, the solid state switches Q1 and Q2 are transitioned from a non-conducting state, in which the solid state switches Q1 and Q2 do not supply power from the line-in 404 to the line-out 406, to a conducting state, in which the solid state switches Q1 and Q2 supply power from the line-in 404 to the line-out 406. In the non-conducting state, the switches Q1 and Q2 are an open circuit such that the power supplied to the line-out 406 (for charging the input capacitance of the lighting system 106) goes through the first resistor R1 and not the switches Q1 and Q2. In the conducting state, the switches Q1 and Q2 are a short circuit such that the power supplied to the line-out 406 goes through the switches Q1 and Q2 and not the first resistor R1. The first resistor R1 should be selected to be significantly smaller (e.g., two or more orders of magnitude lower) than the collective drain-to-source resistance of the switches Q1 and Q2. As a result, a negligible amount of current will flow through the first resistor R1 when the switches Q1 and Q2 are in the conducting state.

Figure 6:
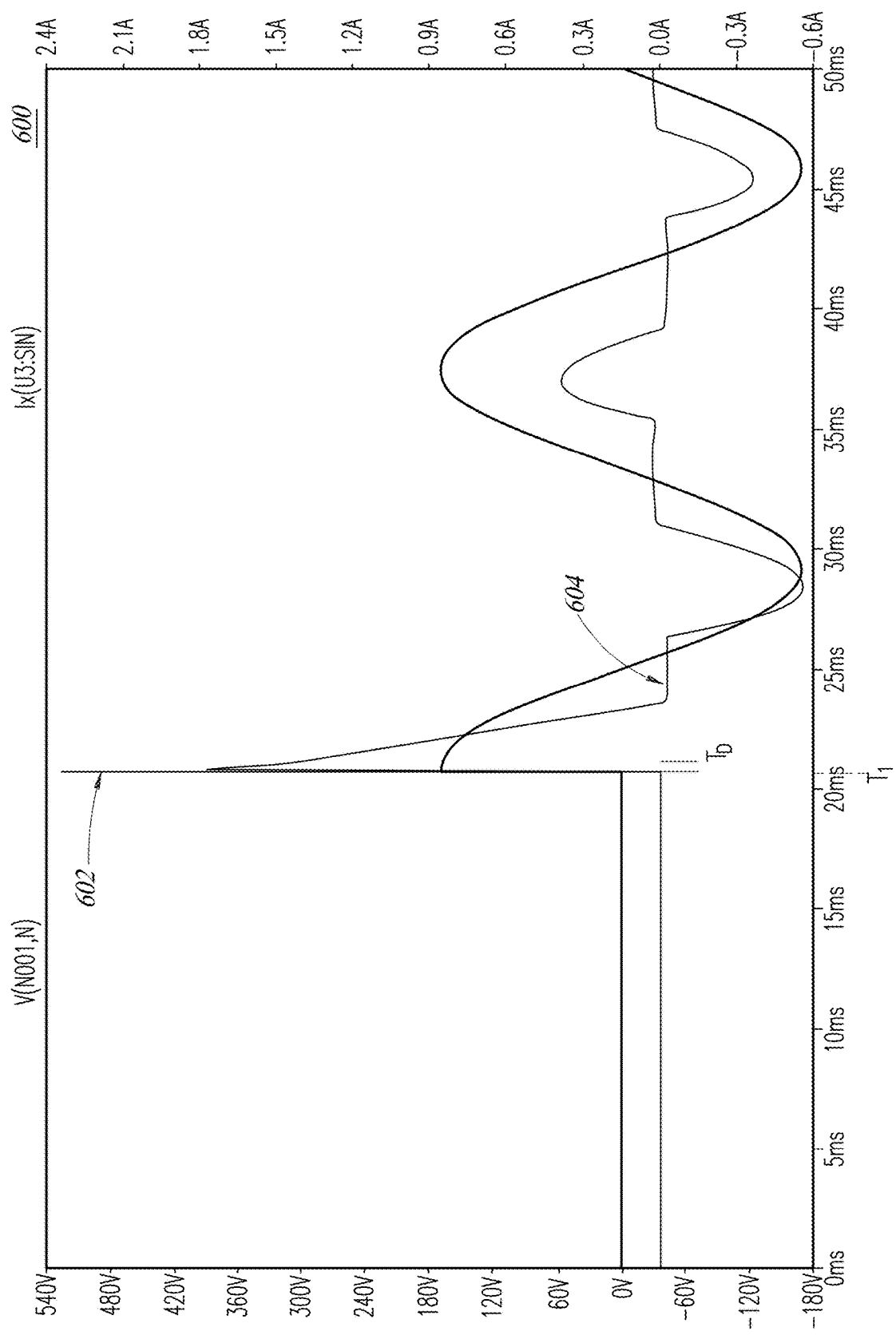
FIG. 6 is a graph of a simulation of current inrush experienced by the external control system of FIG. 5 as a result of closing a switching subsystem of the external control system.

Operation of the shorting cap apparatus 200 will now be described with respect to FIG. 6, which shows a simulation 600 of the voltage and current at the switching subsystem 102S of the external control system 102. Before time $T_1$ shown in FIG. 6, the switching subsystem 102S of the external control system 102 is in the open state and the solid state switches Q1 and Q2 are in the non-conducting state. At time $T_1$, the switching subsystem 102S transitions to the closed state; however, in contrast to the simulation shown in FIG. 1B, the protection circuitry 400 limits the inrush current to the LED driver of the lighting system 106, protecting the external control system 102 from potential damage caused by excessive inrush current.

In particular, at time $T_1$, when the switching subsystem 102S transitions to the closed state, current supplied from the mains power source 104 via the external control system 102 flows through the protection circuitry 400 to begin charging the input capacitance of the LED driver of the lighting system 106. Current inrush to the lighting system 106 when the external control system 102 transitions to the closed state is significantly less than the current inrush of FIGS. 1A and 1B. Referring to FIG. 6, current inrush 602 during this transition period is less than 2.5 Amps (~2.3 Amps)—two orders of magnitude less than the current inrush of the simulation 114 of FIG. 1B. During this initial period of LED driver charging, the solid state switches Q1 and Q2 are in the non-conducting state and the current flows into the line-in 404, through the resistor R1 of the protection circuitry 400, and out of the line-out 406 to begin charging the LED driver of the lighting system 106. The value of R1 is selected according to the power dissipation limit of the resistance and the input current requirements of the lighting system 106. Values of the resistor R1 in the range of 100 ohms to 300 ohms work well for typical LED driver input capacitance and line voltage values below 500 volts. However, those of ordinary skill in the art will appreciate that other values for R1 may be appropriate depending on the application.

The delay subcircuit 410 provides a time delay $T_D$ (not shown to scale) between the time $T_1$ and the time at which the solid state switches Q1 and Q2 are transitioned to the conducting state to begin conducting power to the lighting system 106. In the implementation described and depicted with respect to FIG. 4, the capacitor C1 is charged until a voltage accumulates at the second node 414 sufficient to transition the solid state switches Q1 and Q2 into the conducting state—for example, a state in which the solid state switches Q1 and Q2 are operating in saturation. Specifically, at time $T_1$, current flows into the neutral line 402 and the line-in 404, through the resistors R2 and R3, and begins charging the capacitor C1 via the diode bridge B1 to cause a floating DC voltage to be generated across the capacitor C1. At the end of the time delay $T_D$, the floating voltage of the capacitor C1 achieves a voltage level exceeding the threshold voltage of the solid state switches Q1 and Q2 (i.e., gate-to-source voltage exceeding threshold voltage of the solid state switches Q1 and Q2), causing the solid state switches Q1 and Q2 to transition the protection circuitry 400 to the conducting state. After the time delay $T_D$, the power will settle into a steady state condition 604 in which the lighting system 106 is illuminated. As a result of the switches Q1 and Q3 being transitioned to the conducting state, current flowing into the line-in 404 will bypass the first resistor R1 such that almost all of the current will flow through the switches Q1 and Q2 instead of the first resistor R1 due to the very low drain-to-source resistance of the switches Q1 and Q2.

The protection circuitry 400 should be designed to provide a time delay $T_D$ sufficient to charge the input capacitance of the LED drivers. A time delay $T_D$ of at least 1 millisecond, for example, may be provided to ensure sufficient charging of the LED driver input capacitance. Values are selected for the resistors R2 and R3 and the capacitor C1 at least in part according to the desired time delay $T_D$. For instance, resistors R2 and R3 respectively having resistances of 300 k Ohms, and a capacitor having a value of 4.7 µF may be selected to provide a time delay $T_D$ exceeding 1 millisecond. Additional capacitors may be added in parallel to the capacitor C1 to adjust the time delay $T_D$. Those of ordinary skill in the art will appreciate that these values may be adjusted to increase or decrease the desired time delay $T_D$. MOSFETs with a low drain-source resistance should be selected for the solid state switches Q1 and Q2 to minimize power dissipation in the protection circuitry 400 when operating in the conducting state. The solid state switches Q1 and Q2 shown in FIG. 4 are enhancement-mode N-channel MOSFETs; however, other types of solid state switches or electrical relays could be used to provide AC switching circuit elements in the protection circuitry 400. In some implementations, the protection circuitry 400 may include a capacitive drop series impedance to create a power limiting impedance at line frequency of the mains power supply 104. For example, one or more capacitors may be connected with respective ones of the resistors R1, R2, and/or R3 to create the desired impedance. The Zener diode D5 may be included in parallel with the diode bridge B1 and the capacitor C1 to protect against transient high voltages.

Attachment of the shorting cap apparatus 200, as described herein, allows the lighting system 106 to be remotely controllable by an external control system 102. Additionally, the protection circuitry 400 of the shorting cap apparatus 200 protects components of the external control system 102 from potential damage due to excessive inrush current by providing the time delay $T_D$ after the switching subcircuit 102S of the external control device transitions to the closed state to cause illumination of the lighting system 106.

The various embodiments described above can be combined to provide further embodiments. To the extent they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety, including but not limited to U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Pat. No. 9,801,248, issued Oct. 24, 2017; PCT Publication No. WO2014/018773, published Jan. 30, 2014; U.S. Provisional Patent Application No. 61/723,675, filed Nov. 7, 2012; U.S. Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Pat. No. 9,781,797, issued Oct. 3, 2017; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Non-provisional patent application Ser. No. 15/369,559, filed Dec. 5, 2016; U.S. Provisional Patent Application No. 62/397,709, filed Sep. 21, 2016; U.S. Non-provisional patent application Ser. No. 15/709,022, filed Sep. 19, 2017; U.S. Provisional Patent Application No. 62/397,713, filed Sep. 21, 2016; U.S. Non-provisional patent application Ser. No. 15/709,028, filed Sep. 19, 2017; U.S. Provisional Patent Application No. 62/327,939, filed Apr. 26, 2016; U.S. Non-provisional patent application Ser. No. 15/496,985, filed Apr. 25, 2017; U.S. Provisional Patent Application No. 62/379,037, filed Aug. 24, 2016; U.S. Non-provisional patent application Ser. No. 15/681,927, filed Aug. 21, 2017; U.S. Provisional Patent Application No. 62/458,970, filed Feb. 14, 2017; U.S. Non-provisional patent application Ser. No. 15/895,439, filed Feb. 13, 2018; U.S. Provisional Patent Application No. 62/480,833, filed Apr. 3, 2017; U.S. Non-provisional patent application Ser. No. 15/943,183, Apr. 2, 2018; U.S. Provisional Patent Application No. 62/507,730, filed May 17, 2017; U.S. Non-provisional patent application Ser. No. 15/980,978, filed May 16, 2018; U.S. Non-provisional patent application Ser. No. 15/799,744, filed Oct. 31, 2017; U.S. Provisional Patent Application No. 62/669,883, filed May 10, 2018; and U.S. Provisional Patent Application No. 62/701,392, filed Jul. 20, 2018. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A shorting cap apparatus for providing a shorting connection from a mains power input connection of a lighting system to a load of the lighting system, the shorting cap apparatus comprising:
a housing;
one or more circuit boards housed by the housing;
a connector accessible from an exterior of the housing, the connector including a set of connector elements sized and shaped to interface with corresponding connector elements of a connector of the lighting system, the set of connector elements including at least a first connector element, a second connector element, and a third connector element; and
inrush current protection circuitry included on the one or more circuit boards, the inrush current protection circuitry electrically coupled to at least the first connector element, the second connector element, and the third connector element of the set of connector elements, the inrush current protection circuitry including a first electrical path between the first connector element and the third connector element, a second electrical path in parallel with the first electrical path between the first connector element and the third connector element, and a delay subcircuit, wherein the inrush current protection circuitry:
at a first time at which the inrush protection circuitry begins receiving power via the first connector element and the second connector element, operates in a first mode in which power is supplied to the third connector element through the first electrical path and not the second electrical path, and in which power is supplied to the delay subcircuit from the first connector element and the second connector element; and
at a second time after the first time, as a result of the delay subcircuit achieving a defined condition, operates in a second mode in which power is supplied from the first connector element to the third connector element through the second electrical path.

2. The shorting cap apparatus of claim 1, the inrush current protection circuitry further comprising a set of switches operable to transition between a non-conducting state and a conducting state, the set of switches comprising the second electrical path, wherein the delay subcircuit causes the set of switches to transition from the non-conducting state to the conducting state at the second time.

3. The shorting cap apparatus of claim 2 wherein the set of switches are solid state switches connected in series with each other and the set of switches are in parallel with the first electrical path.

4. The shorting cap apparatus of claim 2 wherein the defined condition is a voltage level of the capacitor exceeding a voltage threshold for the set of switches.

5. The shorting cap apparatus of claim 4 wherein a voltage level of the capacitor corresponds to power received by the inrush current protection circuitry at the first connector and the second connector.

6. The shorting cap apparatus of claim 1 wherein the delay subcircuit comprises a diode bridge and at least one capacitor.

7. The shorting cap apparatus of claim 6 wherein the at least one capacitor is connected in parallel with the diode bridge.

8. The shorting cap apparatus of claim 7, the delay subcircuit further comprising a Zener diode connected in parallel with the diode bridge and the at least one capacitor.

9. The shorting cap apparatus of claim 6 wherein the set of switches are solid state switches connected in series with each other and the set of switches are in parallel with the first electrical path, the delay subcircuit comprises a first node and a second node, the first node being electrically connected to gate terminals of the solid state switches, and the second node of the delay subcircuit being electrically connected to source terminals of the solid state switches.

10. The shorting cap apparatus of claim 9 the diode bridge comprising a first pair of diodes connected in series and a second pair of diodes connected in series, the second pair of diodes connected in parallel with the first pair of diodes, wherein cathodes of the first pair of diodes of the diode bridge are connected at the first node of the delay subcircuit and anodes of the second pair of diodes of the diode bridge are connected at the second node of the delay subcircuit.

11. The shorting cap apparatus of claim 10 wherein an anode of a first diode of the first pair of diodes is connected to a cathode of a first diode of the second pair of diodes to form a third node, and an anode of a second diode of the first pair of diodes is connected to a cathode of a second diode of the second pair of diodes to form a fourth node.

12. The shorting cap apparatus of claim 11, the inrush protection further including a second resistor electrically connecting the third node to the first connector element and a third resistor electrically connecting the fourth node to the second connector element.

13. A shorting cap apparatus that provides a shorting connection from a mains power input connection of a lighting system to a load of the lighting system, the shorting cap apparatus comprising:
a housing;
one or more circuit boards housed by the housing;
a connector accessible from an exterior of the housing, the connector including a set of connector elements to electrically communicatively couple with corresponding connector elements of a connector of the lighting system, the set of connector elements including a first connector element of the set of connector elements at a first node, a second connector element of the set of connector elements at a second node, and a third connector element of the set of connector elements at a third node; and
inrush current protection circuitry included on the one or more circuit boards, the inrush current protection circuitry electrically coupled to the first node, the second node, and the third node, the inrush current protection circuitry including:
a first set of resistors that forms a first electrical path between the first node and the second node;
one or more switches connected between the first node and the second node in parallel with the first set of resistors, the one or more switches collectively operable to transition between a first state and a second state, the first state in which the one or more switches do not transfer power received at the first node to the second node, and the second state in which the one or more switches establish a second electrical path that transfers power received at the first node to the second node, establishment of the second electrical path which causes current to bypass the first electrical path; and
a subcircuit that transitions the one or more switches from the first state to the second state based at least in part on a condition of one or more electrical components of the subcircuit.

14. The shorting cap apparatus of claim 13 wherein the condition of the one or more electrical components is a voltage level of a first subcircuit node of the subcircuit relative to a second subcircuit node of the subcircuit.

15. The shorting cap apparatus of claim 13 wherein the subcircuit comprises a diode bridge and at least one capacitor connected in parallel to the diode bridge.

16. The shorting cap apparatus of claim 15 wherein the capacitor has a first capacitor terminal and a second capacitor terminal, the one or more switches each respectively have a first terminal and a second terminal, and the first capacitor terminal of the capacitor is connected to the first terminal of the one or more switches and the second capacitor terminal of the capacitor is connected to the second terminal of the one or more switches.

17. The shorting cap apparatus of claim 16 wherein the condition of the one or more electrical components is a voltage level of the first capacitor terminal relative to the second capacitor terminal.

18. The shorting cap apparatus of claim 13 wherein the inrush current protection circuitry further comprises a second set of resistors and a third set of resistors, the one or more electrical components being connected to the first node via the second set of resistors, and the one or more electrical components are connected to the third node via the third set of resistors.

19. The shorting cap apparatus of claim 13 wherein the connector is removably attachable to the connector of the lighting system.

20. A shorting cap apparatus for providing a shorting connection from a mains power input connection of a lighting system to a load of the lighting system, the shorting cap apparatus comprising:
a housing;
one or more circuit boards housed by the housing;
a connector accessible from an exterior of the housing, the connector including a set of connector elements to electrically communicatively couple with corresponding connector elements of a connector of the lighting system, the set of connector elements including a first connector element of the set of connector elements at a first node, a second connector element of the set of connector elements at a second node, and a third connector element of the set of connector elements at a third node; and
inrush current protection circuitry included on the one or more circuit boards, the inrush current protection circuitry electrically coupled to the first node of the inrush current protection circuitry, the second node of the inrush current protection circuitry, and the third node of the inrush current protection circuitry, the inrush current protection circuitry including:
a first set of resistors that forms a first electrical path between the first node and the second node;

one or more switches connected between the first node and the second node in parallel with the first set of resistors, the one or more switches collectively operable to transition between a first state and a second state, the first state in which the one or more switches do not supply power received at the first node to the second node, and the second state in which the one or more switches establish a second path to supply power received at the first node to the second node; and a delay subcircuit that causes the one or more switches to transition from the first state to the second state after expiration of a period of time beginning at a first time at which the shorting cap apparatus begins to receive power from an external source.

21. The shorting cap apparatus of claim 20 wherein the delay subcircuit comprises a diode bridge connected to a capacitor, and the period of time corresponds to a voltage accumulated on the capacitor via the diode bridge beginning at the first time.

22. The shorting cap apparatus of claim 20 wherein a resistance between the first node and the second node is lower after the expiration of the period of time.

23. The shorting cap apparatus of claim 20 wherein the period of time corresponds to a time period sufficient to fully charge an input capacitance of a light-emitting diode driver circuit.

24. The shorting cap apparatus of claim 20 wherein the one or more switches comprise at least one electromechanical relay.

25. The shorting cap apparatus of claim 20, wherein the delay subcircuit further comprises a second set of resistors connected in parallel with the capacitor.

26. The shorting cap apparatus of claim 20 wherein the period of time is at least one millisecond.

* * * * *